United States Patent

[11] 3,558,924

[72] Inventor Edward Lindell
Woodland Hills, Calif.
[21] Appl. No. 683,071
[22] Filed Oct. 23, 1967
[45] Patented Jan. 26, 1971
[73] Assignee General Precision Systems Inc.
a corporation of Delaware
Continuation of application Ser. No. 394,747, Sept. 8, 1964, now abandoned, which is a continuation-in-part of application Ser. No. 178,774, Mar. 9, 1962, now abandoned.

[54] MASTER TIMING CIRCUIT FOR PROVIDING DIFFERENT TIME DELAYS TO DIFFERENT SYSTEMS
8 Claims, 3 Drawing Figs.

[52] U.S. Cl. .... 307/260, 307/228, 307/235, 307/293, 328/62, 328/75, 328/147
[51] Int. Cl. .... H03k 5/00
[50] Field of Search .... 307/228, 235, 293; 328/70, 129, 62, 75, 147, 55

[56] References Cited
UNITED STATES PATENTS

| | | | |
|---|---|---|---|
| 2,420,374 | 5/1947 | Houghton | 328/153X |
| 2,821,657 | 1/1958 | Newhouse | 307/228X |

*Primary Examiner*—Donald D. Forrer
*Assistant Examiner*—John Zazworsky
*Attorney*—Joseph R. Dwyer

ABSTRACT: A master timing circuit is described in the following specification which includes a ramp generator and a plurality of comparator output circuits, and which is capable of providing different time delayed outputs to each of a plurality of different inputs on a time shared basis insofar as the inputs are concerned, and which is extremely stable in its operation.

INVENTOR:
Edward Lindell

By Joseph R. Dwyer
Attorney

INVENTOR
Edward Lindell
By [signature]
Attorney

MASTER TIMING CIRCUIT FOR PROVIDING DIFFERENT TIME DELAYS TO DIFFERENT SYSTEMS

This application is a continuation of copending application Ser. No. 394,747, now abandoned, which was filed Sept. 8, 1964, and which itself constituted a continuation-in-part of copending application Ser. No. 178,774, filed Mar. 9, 1962, now abandoned.

BACKGROUND OF THE INVENTION

The timing control system of the invention is particularly suited, for example, to control one or more tape transports associated with computer or data processor. The computer or data processor applies appropriate input signals to the timing control system of the invention, which correspond to the signals initiating different timing cycles on the associated tape transport or transports. The timing control system provides separate delayed output signals at separate output terminals in for each input signal indicating, for example, that sufficient time has elapsed for the tape to be capable of receiving or producing data.

The timing control system to be described includes a master timing circuit. This master timing circuit is time-shared to provide all the necessary timing signals required, for example, to control the associated tape transports. By the use of appropriate slave control circuits, a plurality of a asynchronous tape transports, for example, can be selectively controlled from a single synchronous processor source by the timing control system.

Although the timing control system of the invention has been used to advantage in the control of tape transports by a data processor, it will become apparent as the present description proceeds that the timing control system of the invention finds general utility in any application win which stable and flexible time delays are required in, for example, the millisecond range.

It is, accordingly, an object of the present invention to provide an improved timing control system which is extremely stable in its operation and which is capable of providing an adjustable time delay to one or more of a plurality of signals introduced thereto.

Another object of the invention is to provide such an improved timing control system which is capable of providing a multiplicity of time delays to different signals applied thereto, the different signals being translated through at least a portion of the timing control system on a time-shared basis.

Another object of the invention is to provide such an improved timing control system which is capable of providing time delays to the signals applied thereto corresponding to the time delays provided in prior art systems by multivibrator or one-shot network, but with a much higher degree of stability and accuracy as compared with such prior art networks.

A further object of the invention is to provide such an improved timing control system in which the time delays of individual output signals produced thereby may be independently adjusted in a convenient manner, and in which the time delays are susceptible to electronic control, for example, by an associated computer.

Yet a further object of the invention is to provide an improved control system capable of providing independent delay to independent inputs on a time-shared basis so that the number of components required may be reduced, as compared with prior art circuitry of the same general type.

DETAILED DESCRIPTION OF THE ILLUSTRATED EMBODIMENT

Figures 1, 2A:
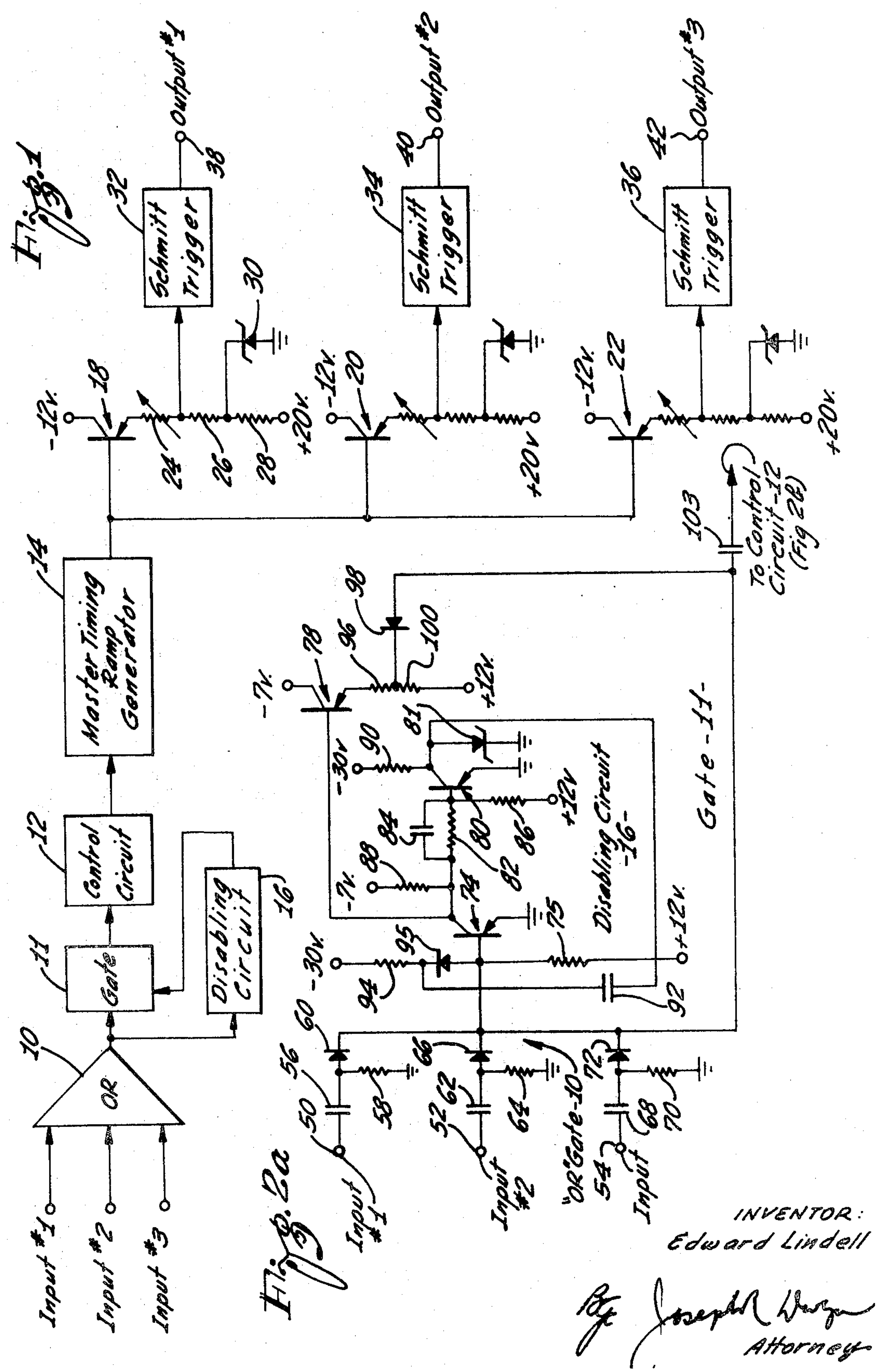
FIG. 1 is a schematic diagram, partly in block, form and partly in circuit detail, of a timing control system constructed in accordance with the present invention.
FIG. 2A and 2B are circuit diagrams of an embodiment of the control system of FIG. 1.

The control system shown in FIG. 1 includes an OR gate 10. As will be described, this OR gate may be an AC-coupled diode type. A plurality of input signals, such as those designated Input 01, Input 02, and Input 03, are introduced to the OR gate 10. The OR gate 10 is coupled to a gate 11 which, in turn, is connnected to a control circuit 12. The control circuit 12 is coupled to a master timing ramp generator 14. A disabling circuit 16 is coupled to the gate 11 and, in a manner to be described, disables the gate 11 for a predetermined time interval after the passage of any signal therethrough. This prevents a subsequent signal applied to the gate 11 from resetting the master timing ramp generator 14 until after the completion of the cycle initiated by the previous signal applied to the control circuit 12.

the output signal from the control circuit 12 is used to reset the ramp generator 14, and to initiate a timing cycle in the ramp generator. This timing cycle is in the form of a ramp signal having an amplitude which increases linearly, for example, in a negative-going direction from zero volts. The ramp signal defines the timing cycle, and the timing cycle lasts, for example, 5.1 milliseconds, if it is not interrupted by a subsequent reset signal during the cycle.

As noted above, the master timing ramp generator 14 includes a linear voltage generator which generates a continuously linearly-varying ramp signal. This ramp signal commences, as noted, at zero volts, and it may increase in a negative direction and terminate at −12 volts.

The ramp signal from the master timing ramp generator 14 is applied to the base electrode of each of a plurality of transistors 18, 20 and 22. Each of the transistor circuits includes a pickoff voltage comparator network, and each comparator develops a differently referenced ramp output signal. Although three comparator networks are included in the system of FIG. 1, it is apparent that more or less may be used, as required in any particular system.

The collector of the transistor 18 is connected to the negative terminal of a 12-volt direct voltage source, and the emitter of the transistor is connected to a potentiometer 24. The potentiometer 24 is connected to a resistor 26 which, in turn, is connected through a a resistor 28 to the positive terminal of a 20-volt direct voltage source. A Zener diode 30 has it cathode connected to the junction of the resistors 26 and 28, and the anode of the Zener diode is grounded. The potentiometer 24 may, for example, have a resistance of 5 kilohms, and the resistor 28 may have a resistance of 330 ohms.

The circuitry of the transistor 18 is rereferencing circuit. This circuit serves to rereference the ramp signal from the master timing ramp generator 14, so that the ramp output signal from the transistor circuit proceeds in a negative direction from a positive voltage and passes through zero, or ground The extent or the rereferencing of the ramp signal, and the time interval required by it to reach ground potential, depends upon the setting of the potentiometer 24. The circuit of the transistor 18, therefore, forms a variable delay circuit, in which the delay may be conveniently adjusted manually, merely by adjusting the potentiometer 24. This adjustment may be carried out manually, or it may be controlled by any appropriate means, such as electronically by an associated computer or data processor.

The junction of the resistors 24 and 26 is connected to a Schmitt trigger network 32, which is also included in the corresponding voltage comparator network. The Schmitt trigger network may have any appropriate circuit connections, and it is constructed to be triggered from a stable to an unstable state, whenever the amplitude of the ramp signal appearing across the resistors 26 and 28 passes through zero. Therefore, the Schmitt trigger 32 develops an output pulse having a timing with respect to the input pulse which initiated the ramp signal in the generator 14, as established by the adjustment of the potentiometer 24.

The transistor 20 may have similar circuitry to the transistor 18, and its circuit is connected to a Schmitt trigger 34. Likewise, the transistor 22 may have circuitry similar to the circuit of the transistor 18, and its circuit is connected to a Schmitt trigger 36. The Schmitt trigger 32 is connected to an output terminal 38 at which one of the above-mentioned outputs, designated "Output 01" is produced. The Schmitt trigger 34 is connected to an output terminal 40, at which the 37 Output 02" is produced. In like manner, the Schmitt trigger 36 is connected to an output terminal 42 at which a third output, designated "Output 03," is produced.

When an input signal, such as the "Input 01," is introduced to the OR gate 10, that input signal is applied to the control circuit 12 to initiate a timing cycle in the master timing ramp generator circuit 14. The input signal also causes the disabling circuit 16 to disable the circuit for a predetermined time interval. This, as noted prevents any further signal from interfering with the timing cycle initiated by the Input 01.

The potentiometer 24, in the circuit of the transistor 18, is adjusted to provide the desired time delay to the Input 01, and the Schmitt trigger 32 is triggered at the proper time to provide the Output 01 and the output terminal 38 corresponding to that time delay. It will be appreciated that the Schmitt triggers 34 and 36 will also be triggered in response to the Input 01, but the logic associated with the output terminals 40 and 42 may be controlled to be unresponsive to signals within the time range of the resulting output signals.

A second input signal, such as the Input 02, may be applied to the OR gate 10. Then, if the disabling circuit 16 has terminated its disabling function, the control circuit 12 will pass the second signal to the master timing ramp generator circuit 14. The resulting ramp signal output from the generator 14 is rereferenced, for example, by the circuit of the transistor 20 to a desired value, so that the Schmitt trigger 34 will provide the Output 02 at the terminal 40 with a desired time delay.

It is evident, therefore, that the system of FIG. 1 is extremely flexible and capable of handling any desired number of input signals to provide corresponding independent output signals at different output terminals. In each instance, the master timing-ramp generator 14 is time-shared by the different signals, so that a plurality of discrete and independent functions may be achieved with a minimum of required circuitry.

Moreover the master timing-ramp generator 14 may be constructed to be extremely precise and accurate in its operation, as may the circuits associated with the transistors 18, 20 and 22. This means that appreciable time delays may be realized, with each time delay being controllable within extremely accurate limits, and to be provided with extreme stability.

The circuit diagram of FIG. 2A includes three input terminals designated 50, 52, and 54. The input terminals are connected to the aforesaid or OR 10. These input terminals receive the three inputs 01, 02 and 03. The OR gate 10 may, as mentioned above, be an alternating current coupled diode type, and the different paths in the OR gate are capable to performing a differentiating function so as to provide sharp positive spikes in response to the respective input signals. To this end, for example, the input terminal 50 is connected to a capacitor 56 which, in turn is connected to a grounded resistor 58 and to the anode of a diode 60. The capacitor 56 may have a capacity, for example, of 390 micro-microfarads, and the resistor 58 may have a resistance of 2.4 kilo-ohms.

Likewise, the input terminal 52 is connected to a capacitor 62 which, in turn, is connected to a grounded resistor 64 and to the anode of a diode 66. Furthermore, the input terminal 54 is connected to a capacitor 68 which, in turn, is connected to a grounded resistor 70 and to the anode of a diode 72. The capacitors 62 and 68 may each have a capacity corresponding to the capacity of the capacitor 56; and the resistors 64 and 70 may each have a resistance corresponding to the resistance of the resistor 58.

The cathodes of the diodes 60, 66 and 72 are connected to the base of a transistor 74. The transistor 74 is connected to form a part of the disabling circuit 16 of FIG. 1. The base of the transistor 74 is connected to a resistor 75. The resistor 75 may, for example, have a resistance of 62 kilo-ohms. This resistor is connected to the positive terminal of the 12-volt direct voltage source.

The emitter of the transistor 74 is grounded, and its collector is connected to the base of transistor 78.

The disabling circuit 16 also includes a transistor 80, the base of which is connected through a resistor 82 to the collector of the transistor 74. The resistor 82 is shunted by a capacitor 84. The collector of the transistor 74 is connected to a resistor 88. The resistor 88 may have a resistance of 680 ohms, and it is connected to the negative terminal of the 7-volt direct voltage source. The base of the transistor 80 is connected to a resistor 86.

The resistor 86, in turn is connected to the positive terminal of the 12-volt direct voltage source.

The collector of the transistor 80 is connected to the anode of a Zener diode 81, the cathode of which is grounded. This collector is also connected to a resistor 90 which in turn, is connected to the negative terminal of a 30-volt direct voltage source. The Zener diode 81 protects the transistor 80 from excessive transient voltages. The resistor 90 may have resistance, for example, of 2.2 kilo-ohms. The collector of the transistor 80 is also connected to a capacitor 92 which, in turn, is connected to a resistor 94 and to the cathode of a diode 95. The anode of the diode 95 is connected back the base of the transistor 74. The resistor 94 is also connected to the negative terminal of the 30-volt direct voltage source.

The collector of the transistor 78 is connected to the negative terminal of the 7-volt direct voltage source, and the emitter of the transistor is connected to a resistor 96. The resistor 96 may have a resistance of 310 ohms, and it is connected to the cathode of a diode 98 and to a resistor 100. The resistor 100 is connected to the positive terminal of the 12-volt direct voltage source, and it may have a resistance of 20 kilo-ohms. The cathodes of the diodes 60, 66 and 72 of the OR gate 10 are also connected to a coupling capacitor 103, and to the anode of the diode 98.

The transistors 74 and 80 are connected to from a usual one-shot multivibrator. In the operation of the circuit thus far described, the transistor 74 of multivibrator is normally conductive and the transistor 80 is normally nonconductive, when the one-shot multivibrator is in its stable state.

Figure 2B:
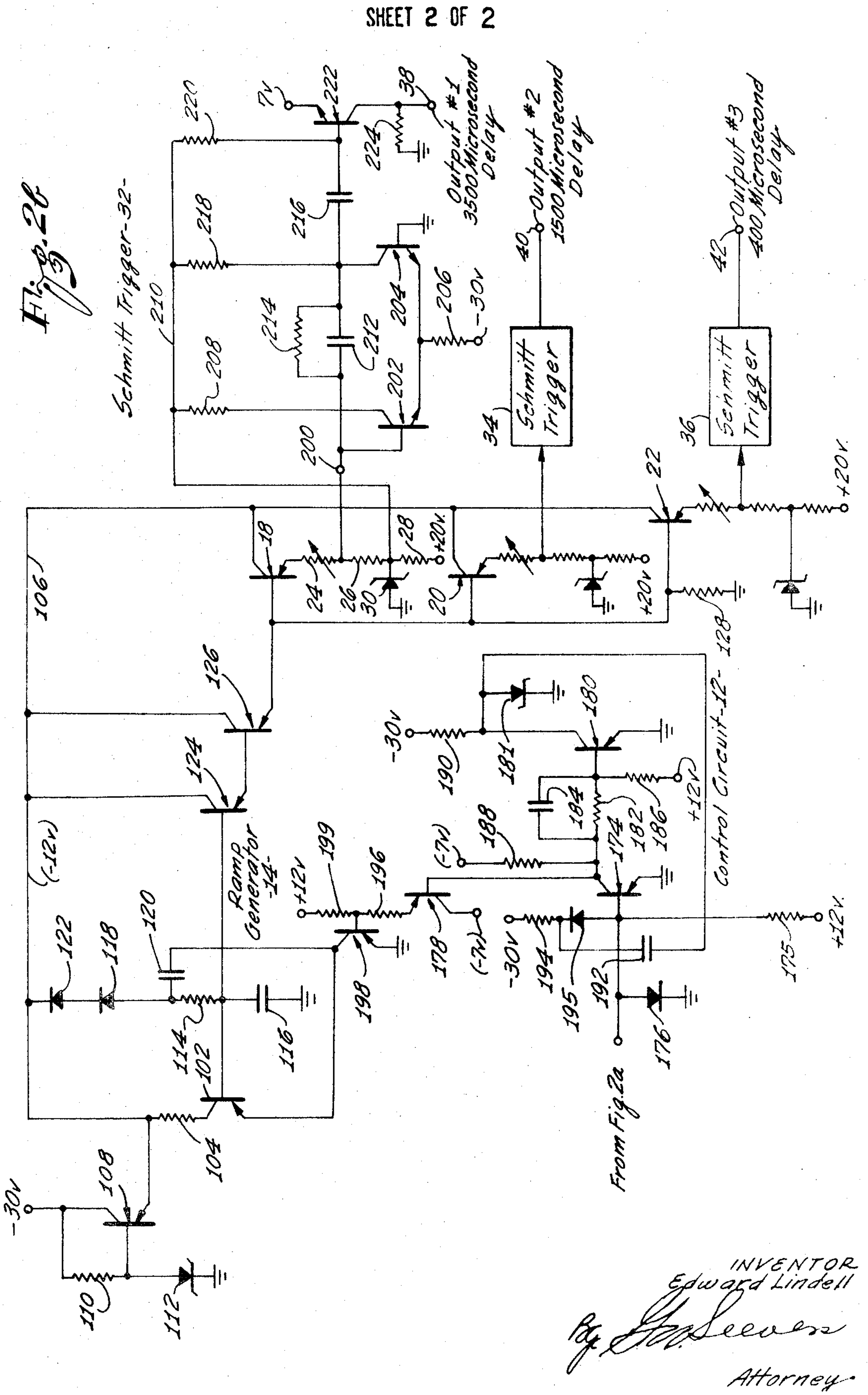

When an Input 01, for example is applied to the input terminal 50 of the OR gate 10, the input is differentiated and the resulting positive spike is passed by the diode 60 to the base of the transistor 74, and the positive spike is also passed by the coupling capacitor 103 to the control circuit 12 of FIG. 2*b to actuate the control circuit in a manner to be described. The positive spike applied to the transistor 74 drives the transistor to its nonconductive state which, by virtue of the multivibrator actions causes the transistor 80 to become conductive. The one-shot multivibrator is thereby triggered from its stable state to its unstable state. When the one-shot multivibrator is thereby is so triggered to its unstable state, the transistor 74 is held non conductive and the transistor 80 is held fully conductive. The non conductive state of the transistor 74 causes the transistor 78 to be fully conductive so long as the one-shot multivibrator is in its unstable state.*

The one-shot multivibrator returns to its stable state, after it has been triggered by the aforesaid positive spike, after a time interval determined by the parameters of the multivibrator. Specifically, the one-shot multivibrator returns to its stable state after a time interval determined by the time constant of the resistance-capacitance network including the capacitors 92 and 84, and the resistances associated therewith. When the one-shot multivibrator returns to its stable state, the transistor 74 again returns to its normally conductive state (rendering the transistor 78 nonconductive), and the transistor 80 again becomes conductive.

As mentioned above, when the one-shot multivibrator is triggered by the positive spike to its unstable state, the transistor 74 become nonconductive, so that the collector potential of the transistor 74 is established at a negative voltage which, in turn, causes the transistor 78 to become fully conductive. The conductivity of the transistor 78 establishes the junction of the resistors 96 and 100 at a value near ground potential, os that the diode 98 effectively clamps the lead to the capacitor 103 at ground potential thereby preventing any further positive spike from reaching the capacitor 103 from the OR gate 10, so long as the multivibrator remains in its unstable state. Therefore the disabling circuit causes the circuitry between the OR gate 10 and the coupling capacitor 103 to function as the gate 11, in that it effectively prevents any positive spike from reaching the coupling capacitor 103 when the disabling circuit multivibrator is in its unstable state. However, the circuit of the transistor 78 serves effectively to establish a ground on the left side of the capacitor 103 when the disabling circuit is on, effectively to prevent the positive spikes from reach the capacitor.

Therefore, the disabling circuit 16 formed by the one-shot multivibrator of the transistor 74 and 80 effectively disassociates the control circuit 12 from the inputs applied to the OR gate 10 for a predetermined interval following the introduction of any one of the inputs applied to the OR gate. This disassociation by the disabling circuit 16, as mentioned above, prevents any other inputs applied to the OR gate 10 from interfering with the action due to a particular input, until the cycle initiated by the particular input has been completed.

It is evident that the Inputs 02 and 03 applied to the input terminals 52 and 54 of FIG. 2a are also differentiated, and their resulting positive spikes are also passed to the control circuit 12 through the gate 11 in the manner described above. The latter positive spike also cause the disabling circuit 16 to actuate the gate 11 in a manner to disassociated the control circuit 12 from the OR gate 10 for a predetermined time interval, established by the parameters of the multivibrator in the disabling circuit. This time interval, for example, may be of order to 5 milliseconds.

The coupling capacitor 103 of FIG. 2a is connected to the base of a transistor 174 of FIG. 2b. The transistor 174 is connected to form part of the control circuit 12 of FIG. 1. The base of the transistor 174 is connected to a resistor 175. The resistor 175 may, for example, have a resistance of 62 kilo-ohms. This resistor is connected to the positive terminal of the 12 direct voltage source.

The base of the transistor 174 is also connected to the anode of a diode 176, the cathode of which is grounded. The diode 176 prevents excessive transient voltages from being applied to the transistor 174. The emitter of the transistor 174 is grounded, and its collector is connected to the base of a transistor 178.

The control circuit 12 also includes a transistor 180, the base of which is connected through a resistor 182 to the collector of the transistor 174. The resistor 182 may have a resistance, for example, of 3.9 kilo-ohms, and it is shunted by a capacitor 184 having a capacity, for example, of 156 micro-microfarads.

The collector of the transistor 174 is also connected to a resistor 188. The resistor 188 may have a resistance of 680 ohms, and it is connected to the negative terminal of the 7-volt direct voltage source. The base of the transistor 180 is connected to a resistor 186. The resistor 186 may have a resistance, for example, of 62 kilo-ohms, and it is connected to the positive terminal of the 12-volt direct voltage source.

The collector of the transistor 180 is connected to the anode of a Zener diode 181, the cathode of which is grounded. The collector is also connected to a resistor 190 which, in turn, is connected to the negative terminal of a 30-volt direct voltage source. The Zener diode 181 protects the transistor 180 from excessive transient voltages. The resistor 190 may have a resistance, for example, of 2.2 kilo-ohms.

The collector of the transistor 180 is also connected to a capacitor 192 which, in turn, is connected to a resistor 194 and to the cathode of a diode 195. The anode of the diode 194 is connected to the base of the transistor 174. The capacitor 192 may have a capacity, for example, of .01 microfarads, and the resistor 194 may have a resistance of 22 kilo-ohms. The resistor 194 is also connected to the negative terminal of the 30-volt direct voltage source.

The transistors 174 and 180 are also connected to form a usual one-shot multivibrator. In the operation of the circuit thus far described, the transistor 174 is normally conductive and the transistor 180 is normally nonconductive, and the one-shot multivibrator is in its stable state. When an Input 01 is applied to the input terminal 50, for example, the input is differentiated, and the resulting positive spike is passed by the diode 60 and through the coupling capacitor 103 to the base of the transistor 174.

As described above, when a positive spike from the OR gate 10 is permitted by the disabling circuit 16 to be applied to the coupling capacitor 103, the positive spike is passed by the coupling capacitor 103 to the transistor 174 of FIG. 2b and drives that transistor to its nonconductive state which, in turn, causes the transistor 180 to become conductive. The transistors 174 and 180 are connected as a one-shot multivibrator, and this multivibrator is triggered by the aforesaid positive spike from its stable to its unstable state.

Subsequently, the one-shot multivibrator formed by the transistors 174 and 180 returns to its stable state, after a time interval determined by the parameters of the multivibrator circuit. When the latter one-shot multivibrator returns to its stable state, the transistor 174 becomes conductive once more and the transistor 180 becomes nonconductive. The result is that the control circuit 12 produces an output pulse at the collector of the transistor 174 in response to each positive spike produced by the OR gate 10 in FIG. 2a which is permitted by the disabling circuit 16 to pass to the control circuit, the aforesaid output pulse of the control circuit 12 having a width determined by the parameters of the one-shot multivibrator of the transistors 174 and 180 in the control circuit.

It is evident that Inputs 02 and 03 applied to the input terminals 52 and 54 of FIG. 2a are also differentiated, and that their positive spikes are also passed to the control circuit 12 in the manner described above. These latter positive spikes also cause the control circuit 12 to produce corresponding output pulses at the collector of the transistor 174, so long as the system is not disabled by the disabling circuit 16 of FIG. 2a.

The collector of the transistor 178 is connected to the negative terminal of the 7-volt direct voltage source, and the emitter of the transistor is connected to a resistor 196. The resistor 196 may have a resistance of 310 ohms, and it is connected to the base of a transistor 198, and to a resistor 199. The resistor 199 is connected to the positive terminal of the 12-volt direct voltage source, and it may have a resistance of 20 kilo-ohms.

The remitter of the transistor 198 is grounded, and the collector is connected to the emitter of a transistor 102. The collector of the transistor 102 is connected to a resistor 104. The resistor 104 may have a resistance, for example, of 1 kilo-ohm, and it is connected to a voltage lead 106. This voltage lead 106 is established at a stable negative voltage of, for example, −12 volts.

The above-mentioned stable negative voltage on the lead 106 is produced on the circuit of a transistor 108. The emitter of the transistor is connected to the voltage lead 106, and its collector is connected to the negative terminal of the 30-volt direct voltage source. The collector of the transistor 108 is connected to a resistor 110 which, for example, may have a resistance of 270 ohms. The resistor 110 and the base of the transistor 108 are connected to the anode of a Zener diode 112. The cathode of the Zener diode is grounded.

The base of the transistor 102 is connected to the junction of a resistor 114 and a ground ramp-linearizing capacitor 116. The resistor 114 may, for example, have a resistance of 510 kilo-ohms, and the capacitor 116 may have a capacity of .01 microfarads. The resistor 114 is connected to the anode of a diode 118 and to a capacitor 120. The capacitor 120 may have a capacity of 1 microfarad, and it is connected to the collector of the transistor 198 and emitter of the transistor 102.

The cathode of the diode 118 is connected to the anode of a diode 122, and the cathode of the diode 122 is connected to the voltage lead 106. The base of the transistor 102 is connected to the base of a transistor 124; the collector of which is connected to the lead 106 and the emitter of which is connected to the base of a transistor 126. The collector of the transistor 126 is connected to the base of a transistor 126. The collector of the transistor 126 is connected to the voltage lead 106, and the emitter of that transistor is connected to a grounded resistor 128. The resistor 128 may, for example, have a resistance 3 kilo-ohms. The transistors 124 and 126 are connected as a well known Darlington impedance-transformation circuit.

The circuitry of the transistors 178, 198, 102 and 124 constitutes the master timing-ramp generator 14. This ramp generator may, for example, be a transistorized version of a Miller-type integrator amplifier.

The transistor 178 is normally at a low level of conductivity and the transistor 198 is normally nonconductive. When a positive spike is received by the transistor 174 from the OR gate 10, the momentary nonconductive state of the transistor 174 triggers the one-shot multivibrator in the control circuit 12. The resulting pulse at the collector of the transistor 174 increases the conductivity of the transistor 178 and causes the transistor 198 to become conductive for a period determined by the parameters of the aforesaid one-shot multivibrator circuit.

When the transistor 198 is conductive, it completes a path for the capacitor 120 from the −12 volt lead 106 to ground and causes that capacitor to become charged. At the same time, the emitter of the transistor 102 is grounded and the capacitor 116 is discharged through the base-emitter diode of the transistor 102 and through transistor 198.

When the transistor 198 returns to its nonconductive state, the charge in the capacitor 120 now flows through the emitter-base path of the transistor 102 and into the capacitor 116 to charge the latter capacitor at a strictly linear rate. This sets up a ramp signal current flow through the Darlington circuit of the transistors 124 and 126, and through the resistor 128 which increases in the negative direction from zero, as the capacitor 116 is charged linearly by the capacitor 120.

As mentioned above, the negative-going ramp signal from the ramp generator 14, which appears across the resistor 128, is applied to the base electrode of each of the transistors 18, 20 and 22. As also explained, the circuits of the transistors 18, 20 and 22 are independently adjustable fore rereferencing the ramp signal for timing control purposes.

Appropriate circuitry for the Schmitt trigger 32 is shown in FIG. 2*b*. It will be understood, of course, that the Schmitt triggers 34 and 36 may have a similar circuitry.

As shown in FIG. 2*b*, Output 01 may have a delay of 3,500 microseconds, the Output 02 may have a delay of 1,500 microseconds, and the Output 03 may have a delay of 400 microseconds. These delays, of course, are shown merely by way of example.

The Schmitt trigger 32 includes an input terminal 200 which is connected to the junction of the potentiometer 24 and resistor 26. The input terminal 200 is connected to a transistor 202.

It should be noted that the transistors previously referred to herein are all of the PNP type. However, the transistor 202 and a further transistor 204 in the Schmitt trigger 32 are both of the NPN type.

The emitters of the transistors 202 and 204 are both connected to a resistor 206. The resistor 206, for example, may have a resistance of 2.4 kilo-ohms, and it is connected to the negative terminal of a 30-volt direct voltage source. The collector of the transistor 202 is connected to a resistor 208. The resistor 208 is connected to a constant voltage lead 210. The voltage lead 210 provides a direct current exciting potential for the Schmitt trigger, which is derived across the Zener diode 30.

Any slight variations in the voltage base of the ramp signal appearing across the resistors 26 and 28 is also reflected in the direct current exciting potential to the Schmitt trigger 32, so that such slight variations in the base or the ramp signal do not create errors in the timing of the triggering of the corresponding Schmitt trigger.

The input terminal 200 is also connected to a capacitor 212 which is shunted by a resistor 214. The capacitor 212 may, for example, have a capacity of 390 micro-microfarads, and the resistor 214 may have a resistance of 20 kilo-ohms. The capacitor and resistor are connected to a further capacitor 216, to a resistor 218, and to the collector of the transistor 204. The base of the transistor 204 is grounded. The capacitor 216 has a capacity, for example, of 1,000 micro-microfarads, and the resistor 218 has a resistance, for example, of 1.2 kilo-ohms.

The resistor 218 is connected to the voltage lead 210 as is a resistor 220. The resistor 220 has a resistance, for example, of 10 kilo-ohms, and it is connected to the base of a transistor 222. The transistor 222 is also an NPN transistor. The collector of the transistor 222 is connected to a grounded resistor 224 and to the output terminal 38. The resistor 224 may have a resistance, for example, of 470 ohms.

As explained above, the adjustment of the potentiometer 24 in the circuit of the transistor 18 changes the reference of the ramp signal, so that the ramp signal passed through the circuit proceeds from a positive voltage through zero, rather than from zero to a negative value. The Schmitt trigger 32 is normally in a stable state in which the transistor 202 is conductive and the transistor 204 is nonconductive. However, the moment that the ramp signal appearing at the junction of the potentiometer 24 and resistor 26 passes through zero, the Schmitt trigger 32 is triggered to its unstable state.

The triggering of the trigger 32 to its unstable state causes a pulse to be passed to the transistor 222, and to appear at the output terminal 38. The output pulse (Output 01) is time delayed, with respect to the corresponding Input 01, as determined by the adjustment of the potentiometer 24.

Likewise, and as explained above, the other Inputs 02 and 03 are respectively cause the Schmitt trigger 34 to produce independent delayed pulses (Output 02) at the output terminal 40, and the Schmitt trigger 36 to produce independent delayed pulses (Output 03) at the output terminal 42.

The system described herein, therefore, is extremely flexible in that it is capable of handling any desired number of input pulses, and of producing independently delayed output pulses at separate output terminals. The system is also advantageous is that is uses but a single master generator on a time-shared basis for saving in components and circuitry. Also, and as explained above the circuit of the invention is extremely accurate and stable, and it is capable of providing relatively long delays in the millisecond range.

While a particular embodiment of the invention has been shown and described, modifications may be made, and it is intended in the following claims to cover all modifications which fall within the scope of the invention.

I claim:

1. A timing control system including: an input circuit means responsive to an input signal for producing a trigger signal; a master-timing circuit coupled to said input circuit means and responsive to said trigger signal for generating a ramp signal having a linearly varying amplitude and referenced to a particular potential base, said ramp signal increasing in a negative direction from zero potential to a predetermined negative potential value; circuit means coupled to said master timing circuit and including a voltage comparator network means for rereferencing said ramp signal to increase said negative direction from a predetermined positive value through zero potential; and trigger circuit means coupled to said circuit means for producing an output signal when the rereferenced ramp signal of said circuit means passes through zero potential value.

2. The timing control system defined in claim 1, in which said circuit means includes a transistor having a base connected to said master timing circuit and having an emitter connected to said voltage comparator network means, and adjustable potentiometer means connected to said emitter for controllably changing the starting potential value of the ramp signal passed by said circuit means.

3. The timing control system defined in claim 1 in which said master timing circuit generates a negative-going ramp signal, and in which the starting reference potential of said ramp signal generated by said master timing circuit is zero.

4. The timing control system defined in claim 1 in which the starting potential of the ramp signal translated by said control circuit means has a controllable positive value.

5. A timing control system including: input circuit means responsive to each of a plurality of separate input signals for producing a trigger signal; a master timing circuit coupled to said input circuit means and responsive to said trigger signal for generating a common ramp signal having a linearly varying amplitude and referenced to a particular potential base; a plurality circuits coupled to said master timing circuit and each including a voltage comparator network and adjustable means for controllably rereferencing said ramp signal to different potential bases; and a corresponding plurality of trigger circuits coupled to corresponding ones of said first-named circuits for producing individual output signals when the corresponding rereferenced ramp signals in respective ones of said first-named circuits passes through particular potential reference values.

6. The timing control system defined in claim 5, in which each of said first-named circuits includes a transistor having a base connected to said master timing circuit and an emitter connected to said voltage comparator circuit, and adjustable potentiometer means connected to said emitter for controllably changing the starting potential values of the ramp signal respectively passed by respective ones of said first-named circuits.

7. The control system of claim 5 in which said input circuit means includes an OR gate for producing said trigger signal in response to said separate input signals.

8. The control system defined in claim 5 and which includes disabling circuit means interposed between said input circuit means and said master timing circuit and responsive to any one of said input signals for blocking the path from said input circuit means to said master timing circuit for a predetermined time interval.